US006029192A

United States Patent [19]

Hill et al.

[11] Patent Number: 6,029,192

[45] Date of Patent: Feb. 22, 2000

[54] SYSTEM AND METHOD FOR LOCATING RESOURCES ON A NETWORK USING RESOURCE EVALUATIONS DERIVED FROM ELECTRONIC MESSAGES

[75] Inventors: William Colyer Hill, Montville; Loren Gilbert Terveen, Basking Ridge, both of N.J.

[73] Assignee: AT&T Corp., New York, N.Y.

[21] Appl. No.: 08/815,043

[22] Filed: Mar. 14, 1997

Related U.S. Application Data

[60] Provisional application No. 60/013,518, Mar. 15, 1996.

[51] Int. Cl.[7] .......... G06F 15/16

[52] U.S. Cl. .......... 709/206; 707/500

[58] Field of Search .......... 395/200.33, 200.36, 395/200.37, 200.97, 200.56, 200.59, 200.75; 707/10, 500, 501, 513; 709/203, 206, 207, 217, 226, 229, 245

[56] References Cited

U.S. PATENT DOCUMENTS

| | | | |
|---|---|---|---|
| 5,528,757 | 6/1996 | Yamasaki | 395/200.03 |
| 5,530,852 | 6/1996 | Meske, Jr. et al. | 395/600 |
| 5,708,780 | 1/1998 | Levergood et al. | 395/200.57 |
| 5,761,418 | 6/1998 | Francis et al. | 395/200.31 |

OTHER PUBLICATIONS

T. Beines–Lee et al, Uniform Resource Locators (URL) Network Working Group, RFC 1738, Dec. 1994.

*Primary Examiner*—Mehmet B. Geckil

*Attorney, Agent, or Firm*—Kenyon & Kenyon

[57] ABSTRACT

Resources are located on a network by searching a database including resource evaluation information obtained from electronic messages. Electronic messages having information evaluating network resources such as files, websites, and utilities are identified. Evaluation information including the network address of the evaluated resource is stored in the database. Resource information from the resource itself is also stored. A useful and manageable number of evaluated resource titles responsive to a user request for information are presented to the user. The user can browse evaluation information and fetch the resource.

21 Claims, 15 Drawing Sheets

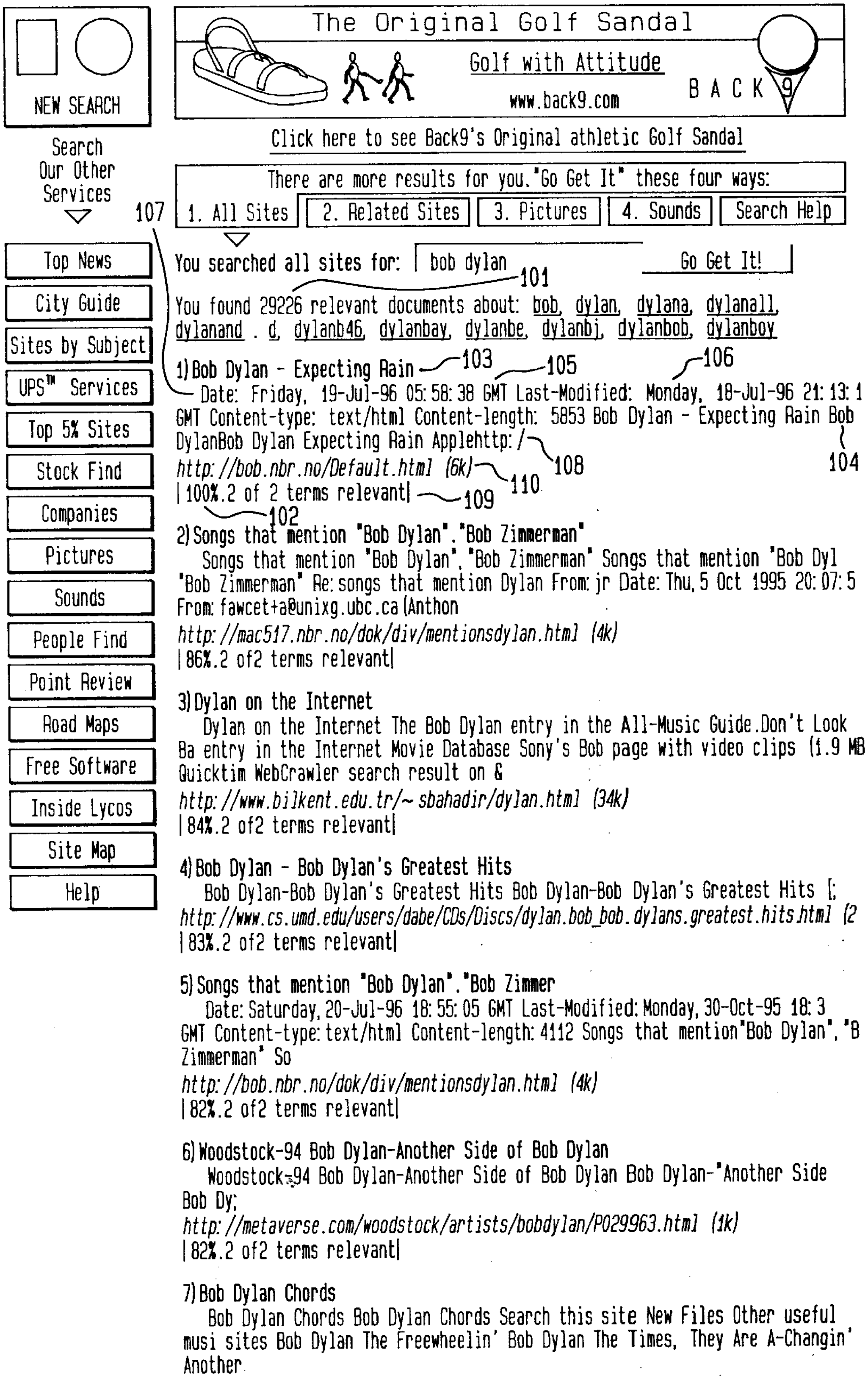

FIG. 1
(PRIOR ART)

| NEW SEARCH | The Original Golf Sandal |
|---|---|
| | Golf with Attitude |
| | www.back9.com  BACK 9 |

Search
Our Other
Services
107

- Top News
- City Guide
- Sites by Subject
- UPS™ Services
- Top 5% Sites
- Stock Find
- Companies
- Pictures
- Sounds
- People Find
- Point Review
- Road Maps
- Free Software
- Inside Lycos
- Site Map
- Help Click here to see Back9's Original athletic Golf Sandal There are more results for you."Go Get It" these four ways:
1. All Sites | 2. Related Sites | 3. Pictures | 4. Sounds | Search Help You searched all sites for: bob dylan          Go Get It!
―――――――――――101
You found 29226 relevant documents about: bob, dylan, dylana, dylanall, dylanand . d, dylanb46, dylanbay, dylanbe, dylanbj, dylanbob, dylanboy 1) Bob Dylan - Expecting Rain ――103 ――105        ――106
  Date: Friday, 19-Jul-96 05:58:38 GMT Last-Modified: Monday, 18-Jul-96 21:13:1
GMT Content-type: text/html Content-length: 5853 Bob Dylan - Expecting Rain Bob
DylanBob Dylan Expecting Rain Applehttp:/                             104
http://bob.nbr.no/Default.html (6k)――108
|100%.2 of 2 terms relevant| ――109 110
  ――102
2) Songs that mention "Bob Dylan"."Bob Zimmerman"
  Songs that mention "Bob Dylan","Bob Zimmerman" Songs that mention "Bob Dyl
"Bob Zimmerman" Re: songs that mention Dylan From: jr Date: Thu, 5 Oct 1995 20:07:5
From: fawcet+a@unixg.ubc.ca (Anthon
http://mac517.nbr.no/dok/div/mentionsdylan.html (4k)
|86%.2 of2 terms relevant|

3) Dylan on the Internet
  Dylan on the Internet The Bob Dylan entry in the All-Music Guide.Don't Look
Ba entry in the Internet Movie Database Sony's Bob page with video clips (1.9 MB
Quicktim WebCrawler search result on &
http://www.bilkent.edu.tr/~sbahadir/dylan.html (34k)
|84%.2 of2 terms relevant|

4) Bob Dylan - Bob Dylan's Greatest Hits
  Bob Dylan-Bob Dylan's Greatest Hits Bob Dylan-Bob Dylan's Greatest Hits [;
http://www.cs.umd.edu/users/dabe/CDs/Discs/dylan.bob_bob.dylans.greatest.hits.html (2
|83%.2 of2 terms relevant|

5) Songs that mention "Bob Dylan"."Bob Zimmer
  Date: Saturday, 20-Jul-96 18:55:05 GMT Last-Modified: Monday, 30-Oct-95 18:3
GMT Content-type: text/html Content-length: 4112 Songs that mention"Bob Dylan","B
Zimmerman" So
http://bob.nbr.no/dok/div/mentionsdylan.html (4k)
|82%.2 of2 terms relevant|

6) Woodstock-94 Bob Dylan-Another Side of Bob Dylan
  Woodstock-94 Bob Dylan-Another Side of Bob Dylan Bob Dylan-"Another Side
Bob Dy;
http://metaverse.com/woodstock/artists/bobdylan/P029963.html (1k)
|82%.2 of2 terms relevant|

7) Bob Dylan Chords
  Bob Dylan Chords Bob Dylan Chords Search this site New Files Other useful
musi sites Bob Dylan The Freewheelin' Bob Dylan The Times, They Are A-Changin'
Another

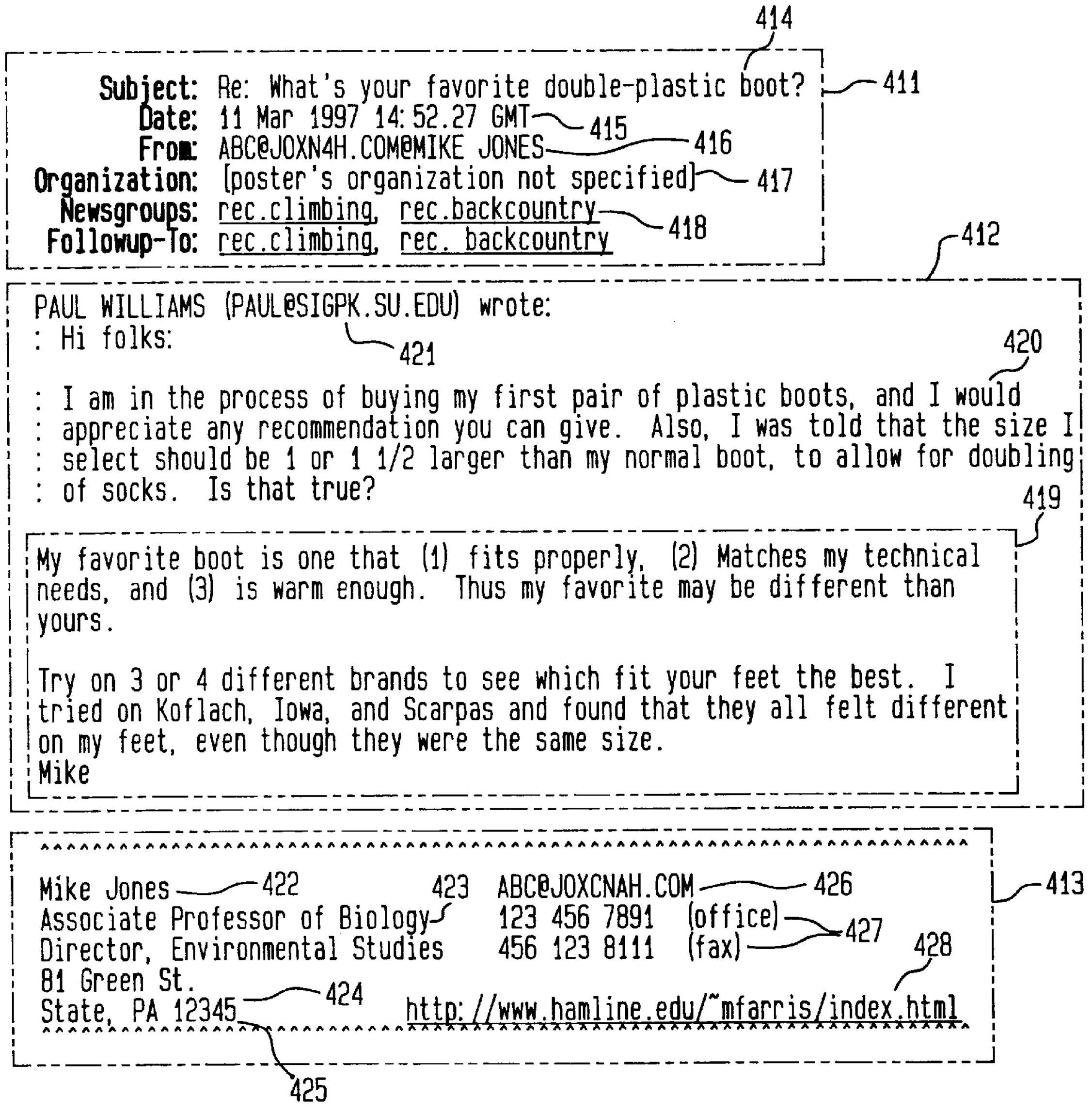

FIG. 4
(PRIOR ART)

```
Subject:      Re: What's your favorite double-plastic boot?
Date:         11 Mar 1997 14:52.27 GMT
From:         ABC@JOXN4H.COM@MIKE JONES
Organization: [poster's organization not specified]
Newsgroups:   rec.climbing, rec.backcountry
Followup-To:  rec.climbing, rec. backcountry
```

PAUL WILLIAMS (PAUL@SIGPK.SU.EDU) wrote:
: Hi folks:

: I am in the process of buying my first pair of plastic boots, and I would
: appreciate any recommendation you can give. Also, I was told that the size I
: select should be 1 or 1 1/2 larger than my normal boot, to allow for doubling
: of socks. Is that true?

My favorite boot is one that (1) fits properly, (2) Matches my technical
needs, and (3) is warm enough. Thus my favorite may be different than
yours.

Try on 3 or 4 different brands to see which fit your feet the best. I
tried on Koflach, Iowa, and Scarpas and found that they all felt different
on my feet, even though they were the same size.
Mike

```
Mike Jones                      ABC@JOXCNAH.COM
Associate Professor of Biology  123 456 7891  (office)
Director, Environmental Studies 456 123 8111  (fax)
81 Green St.
State, PA 12345                 http://www.hamline.edu/~mfarris/index.html
```

FIG. 8

People Helping One Another Know Stuff

*"Together, we know it all."*

Welcome to PHOAKS

As you read this. hundreds of thousands of people around the world are posting messages to thousands of topic-oriented Usenet newsgroups. A small percentage of those netnews messages recommend html pages and other web resources.

PHOAKS reads messages posted to few thousand such Usenet newsgroups in order to tally and summarize web resource recommendations that appear in those messages. PHOAKS' pages here reflect the results. To see an example immediately click here: red.music.dylan.

Our index method mimics exactly the hierarchical structure of Netnews. After each index name, we list the number of web resources PHOAKS has encountered, followed by an "r". PHOAKS filters out spurious and signature references, so in general the number of recommended resources will be quite a bit less than the listed number. PHOAKS does not read .announce .answers or .binaries groups since these specialized types of groups are not sources of recommendations.

If you would like to read about the feasibility studies leading up to the creation of this site, read our CSCW'96 paper.

Navigate up newsgroup tree: PHOAKS Entry Page:

---

Navigate down newsgroup tree: pick a sub-area or newsgroup

- alternative 7949r
  2600 3d aldus + 45
- computers 22680r
  admin ai apps + 64
- miscellaneous 4270r
  activism books business + 26
- recreation (811) 21345r (812)
  animals (813) antiques (814) arts (815) + 52
- science 6686r
  aeronautics agriculture anthropology + 45
- society 7550r
  atheism bi college + 19
- talk 1019r
  abortion atheism bizarre + 8

---

If you know the newsgroup name you may enter it here: [ ] 817

[OK] [Clear Form]

---

Your pheedback is welcome. Please email thefolks@phoaks.com
See thefolks@phoaks.com
Copyright 1996, phoaks. 816

FIG. 9

People Helping One Another Know Stuff

*"Together, we know it all."*

Navigate up newsgroup tree: PHOAKS Entry Page: recreation 96

Navigate down newsgroup tree: pick a sub-area or newsgroup

- animals 40r
  wildlife
- antiques 120r
  marketplace radio+phono
- arts 3515r
  animation anime ascii + 22
- audio 803r
  car high-end marketplace + 5
- autos 320r
  4x4 antique driving + 6
- aviation 564r
  hang-gliding homebuilt ifr + 11
- backcountry 40r
- bicycles 281r
  marketplace miscellaneous off-road + 4
- birds 40r
- boats 280r
  building cruising marketplace + 2
- climbing 40r
- collecting 565r
  cards coins dolls + 5
- crafts 642r
  beads brewing dollhouses + 9
- drugs 120r
  cannabis miscellaneous psychedelic
- equestrian 40r
- folk-dancing 40r
- food 510r
  chocolate cooking drink + 6
- gambling 320r
  blackjack craps lottery + 5
- games 3105r
  abstract backgammon board + 26
- mag 40r
- martial-arts 40r
- miscellaneous 40r
- models 280r
  railroad rc rockets + 1
- motorcycles 160r
  dirt harley racing
- music 3060r
  a-cappella afro-latin ambient + 38
- nude 40r
- org 80r
  mensa sca
- outdoors (91) 280r (95)
  camping (92) fishing (93) marketplace (94) + 2
- parks 40r
  theme
- pets 456r
  birds cats dogs + 2
- photo 520r
  datkroom digital equipment + 4
- ponds 40r
- puzzles 80r
  crosswords
- pyrotechnics 40r
- radio 562r
  amateur broadcasting cb + 5
- roller-coaster 40r
- running 40r
- scouting 40r
- scuba 120r
  equipment locations

FIG. 10

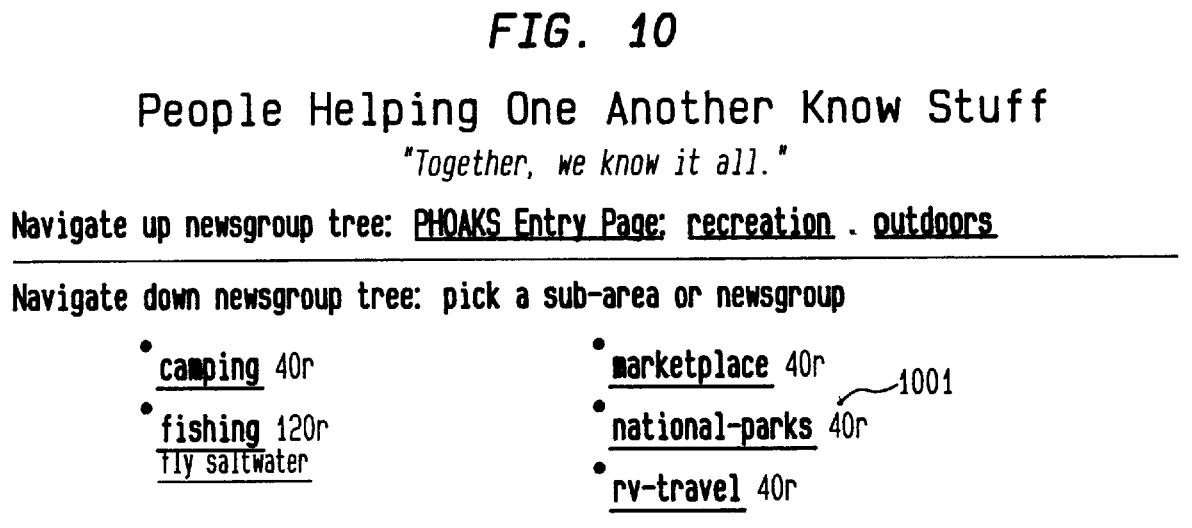

People Helping One Another Know Stuff

*"Together, we know it all."*

Navigate up newsgroup tree: PHOAKS Entry Page: recreation . outdoors

---

Navigate down newsgroup tree: pick a sub-area or newsgroup

- camping 40r
- fishing 120r
  fly saltwater
- marketplace 40r
- national-parks 40r 1001
- rv-travel 40r

FIG. 11

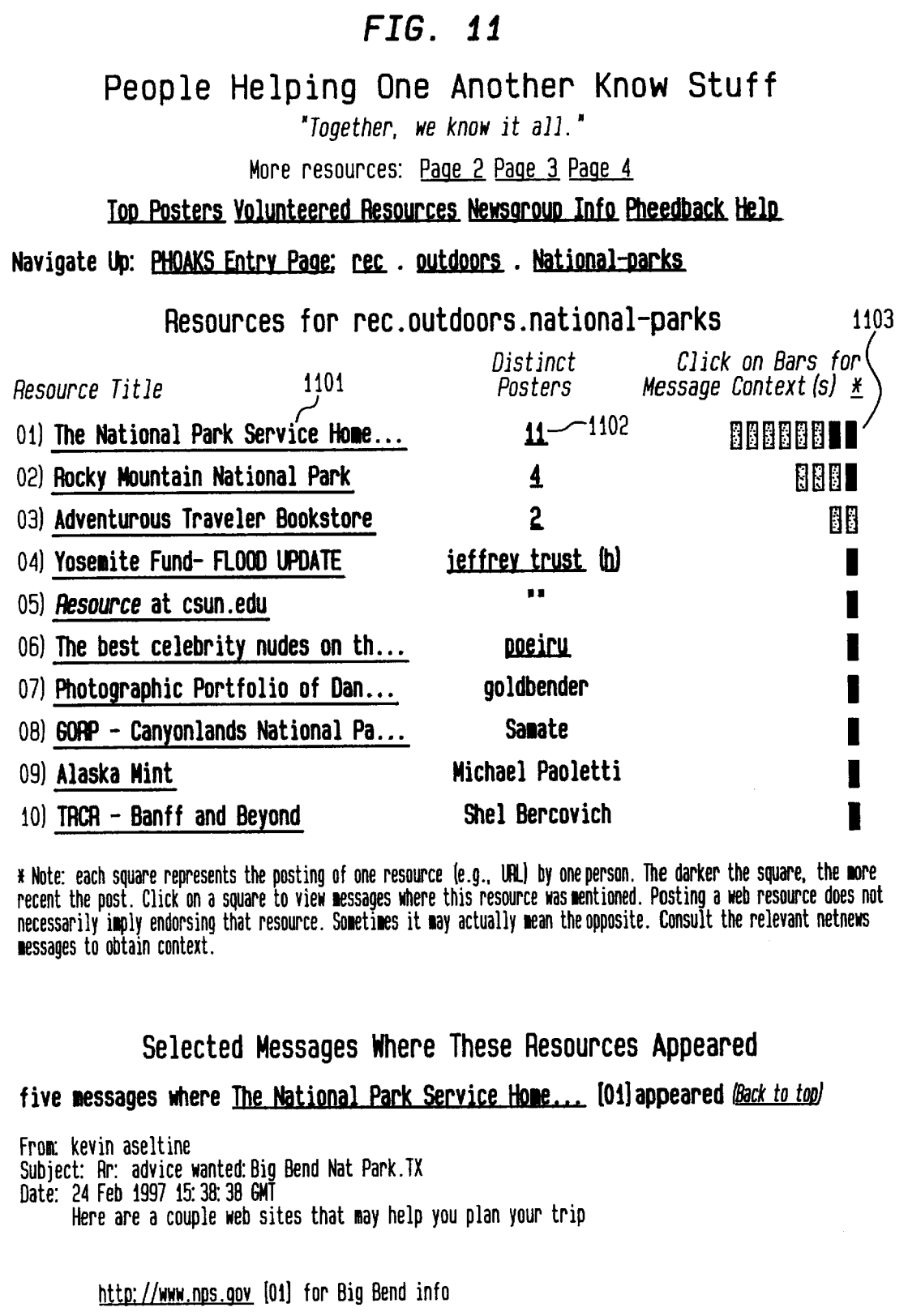

People Helping One Another Know Stuff
*"Together, we know it all."*

More resources: Page 2 Page 3 Page 4

Top Posters Volunteered Resources Newsgroup Info Pheedback Help

Navigate Up: PHOAKS Entry Page; rec . outdoors . National-parks

Resources for rec.outdoors.national-parks        1103

| Resource Title 1101 | Distinct Posters | Click on Bars for Message Context(s) * |
|---|---|---|
| 01) The National Park Service Home... | 11 —1102 |  |
| 02) Rocky Mountain National Park | 4 |  |
| 03) Adventurous Traveler Bookstore | 2 |  |
| 04) Yosemite Fund- FLOOD UPDATE | jeffrey trust (h) |  |
| 05) Resource at csun.edu | .. |  |
| 06) The best celebrity nudes on th... | poeiru |  |
| 07) Photographic Portfolio of Dan... | goldbender |  |
| 08) GORP - Canyonlands National Pa... | Samate |  |
| 09) Alaska Mint | Michael Paoletti |  |
| 10) TRCR - Banff and Beyond | Shel Bercovich |  |

* Note: each square represents the posting of one resource (e.g., URL) by one person. The darker the square, the more recent the post. Click on a square to view messages where this resource was mentioned. Posting a web resource does not necessarily imply endorsing that resource. Sometimes it may actually mean the opposite. Consult the relevant netnews messages to obtain context.

Selected Messages Where These Resources Appeared five messages where The National Park Service Home... [01] appeared (Back to top)

From: kevin aseltine
Subject: Rr: advice wanted: Big Bend Nat Park.TX
Date: 24 Feb 1997 15:38:38 GMT
    Here are a couple web sites that may help you plan your trip http://www.nps.gov [01] for Big Bend info

FIG. 12

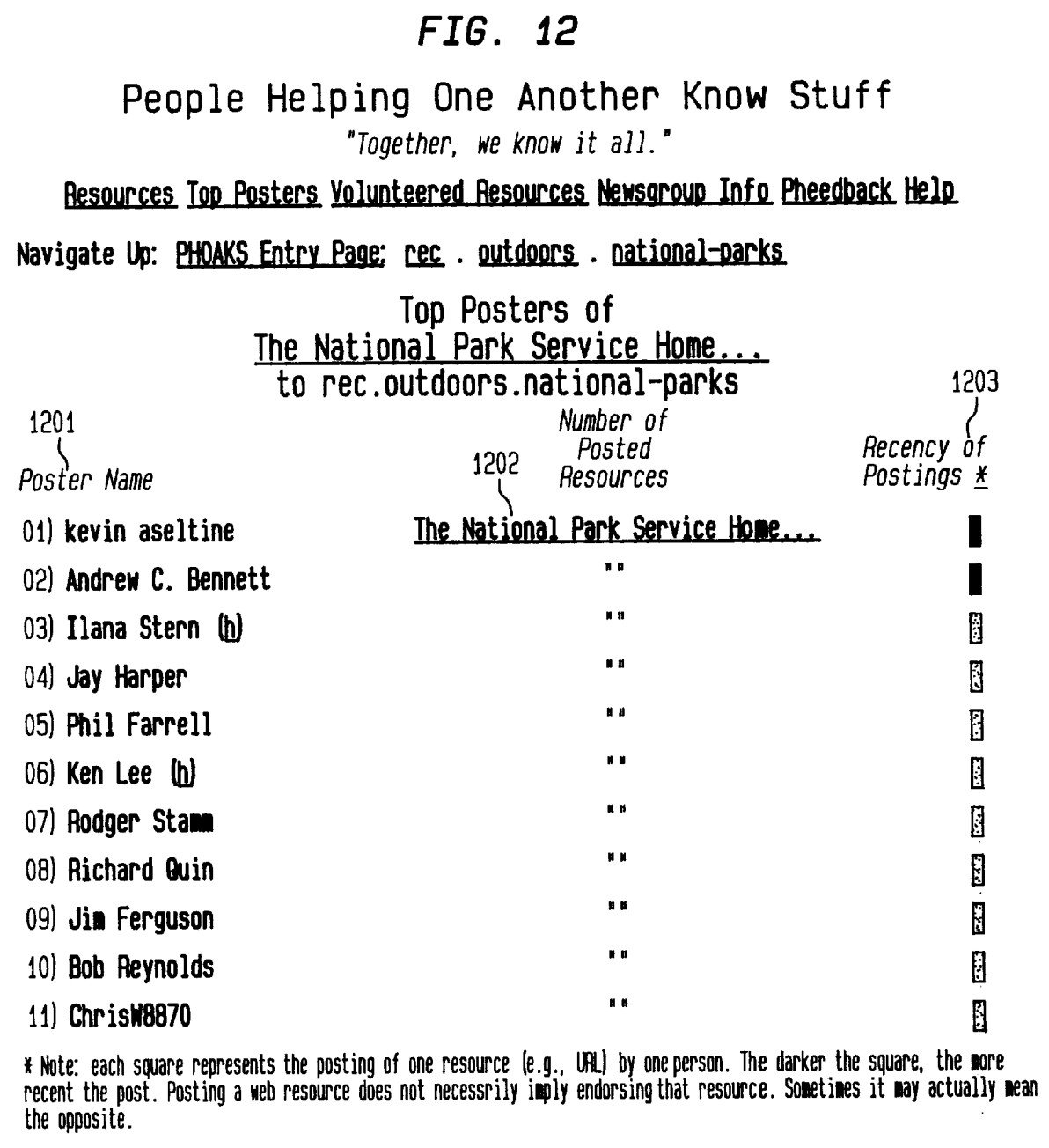

People Helping One Another Know Stuff

*"Together, we know it all."*

Resources Top Posters Volunteered Resources Newsgroup Info Pheedback Help

Navigate Up: PHOAKS Entry Page: rec . outdoors . national-parks

Top Posters of The National Park Service Home... to rec.outdoors.national-parks

1203

| 1201 Poster Name | 1202 Number of Posted Resources | Recency of Postings * |
|---|---|---|
| 01) kevin aseltine | The National Park Service Home... | ■ |
| 02) Andrew C. Bennett | " " | ■ |
| 03) Ilana Stern (h) | " " | □ |
| 04) Jay Harper | " " | □ |
| 05) Phil Farrell | " " | □ |
| 06) Ken Lee (h) | " " | □ |
| 07) Rodger Stamm | " " | □ |
| 08) Richard Quin | " " | □ |
| 09) Jim Ferguson | " " | □ |
| 10) Bob Reynolds | " " | □ |
| 11) ChrisW8870 | " " | □ |

* Note: each square represents the posting of one resource (e.g., URL) by one person. The darker the square, the more recent the post. Posting a web resource does not necessrily imply endorsing that resource. Sometimes it may actually mean the opposite.

FIG. 13 two messages where Rocky Mountain National Park [02] appeared *(Back to top)*

Figure 13:
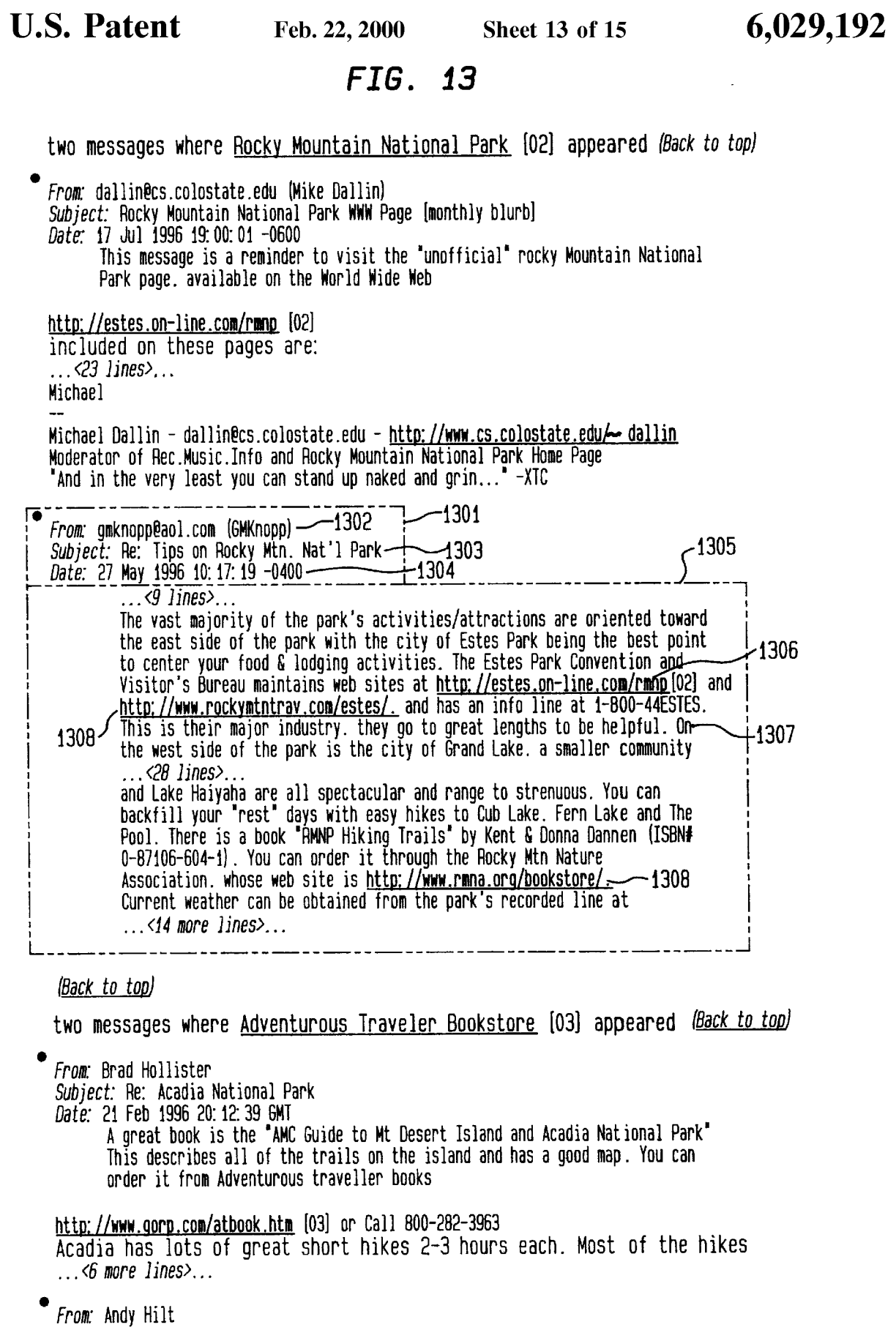

- *From:* dallin@cs.colostate.edu (Mike Dallin)
  *Subject:* Rocky Mountain National Park WWW Page [monthly blurb]
  *Date:* 17 Jul 1996 19:00:01 -0600
  This message is a reminder to visit the "unofficial" rocky Mountain National Park page. available on the World Wide Web http://estes.on-line.com/rmnp [02]
  included on these pages are:
  ...*<23 lines>*...
  Michael
  --
  Michael Dallin - dallin@cs.colostate.edu - http://www.cs.colostate.edu/~dallin
  Moderator of Rec.Music.Info and Rocky Mountain National Park Home Page
  "And in the very least you can stand up naked and grin..." -XTC

- *From:* gmknopp@aol.com (GMKnopp) — 1302 — 1301
  *Subject:* Re: Tips on Rocky Mtn. Nat'l Park — 1303
  *Date:* 27 May 1996 10:17:19 -0400 — 1304 — 1305
  ...*<9 lines>*...
  The vast majority of the park's activities/attractions are oriented toward the east side of the park with the city of Estes Park being the best point to center your food & lodging activities. The Estes Park Convention and (1306) Visitor's Bureau maintains web sites at http://estes.on-line.com/rmnp [02] and http://www.rockymtntrav.com/estes/. (1308) and has an info line at 1-800-44ESTES. This is their major industry. they go to great lengths to be helpful. On (1307) the west side of the park is the city of Grand Lake. a smaller community
  ...*<28 lines>*...
  and Lake Haiyaha are all spectacular and range to strenuous. You can backfill your "rest" days with easy hikes to Cub Lake. Fern Lake and The Pool. There is a book "RMNP Hiking Trails" by Kent & Donna Dannen (ISBN# 0-87106-604-1). You can order it through the Rocky Mtn Nature Association. whose web site is http://www.rmna.org/bookstore/. — 1308
  Current weather can be obtained from the park's recorded line at
  ...*<14 more lines>*...

*(Back to top)* two messages where Adventurous Traveler Bookstore [03] appeared *(Back to top)*

- *From:* Brad Hollister
  *Subject:* Re: Acadia National Park
  *Date:* 21 Feb 1996 20:12:39 GMT
  A great book is the "AMC Guide to Mt Desert Island and Acadia National Park" This describes all of the trails on the island and has a good map. You can order it from Adventurous traveller books http://www.gorp.com/atbook.htm [03] or Call 800-282-3963
  Acadia has lots of great short hikes 2-3 hours each. Most of the hikes
  ...*<6 more lines>*...

- *From:* Andy Hilt

FIG. 14
(PRIOR ART)

excite search reviews city.net live! talk! newstracker
people finder email lookup yellow pages tours NETSCAPE Industry experts agree. Netscape Enterprise Server is #1! editor's choice Search Menu
- New Search
- Advanced Search
- Add URL Check out Reviews!
- Arts
- Business
- Computing
- Education
- Entertainment
- Health
- Hobbies
- Life & Style
- Money
- News
- Personal Pages
- Politics & law
- Regional
- Science
- Shopping
- Sports Did You Know?
Search results are sorted by relevance, indicated by a percentage rating Click 'Sort by Site' to see which websites have the most documents Excite Network
- Excite Home
- Excite Search
- Excite Reviews
- Excite City Net
- Excite Live
- Excite Reference
- Excite Tours Info 1401
Excite Search found 3616122 documents about: rocky mountain national park. 1402
Documents 1-10 sorted by Relevance. Sort by Site 94% Rocky Mountain Adventures River Rafting [More Like This] 1403
*URL:* http://www.omnibus.com:80/rma.html
*Summary:* From these locations we take you on 1/2 day, full day, & two day river rafting trips leaving memories to last a lifetime. Rocky Mountain Adventures is licensed by the State of Colorado and is a member of America Outdoors, the Colorado River Outfitters Association, and the Arkansas River Outfitters Association.

94% CTC - CTIN Travel Info - Alberta, Canada [More Like This] 1404
*URL:* http://info.ic.gc.ca:80/Tourism/Canada/alta.html
*Summary:* Other major online sources of Alberta travel information are accesible from our CANADA page. CANtravel - Western Canada's Travel Directory includes Western Canadian River Adventures.

93% Western Treasures' Discovery Vacations A... [More Like This] 1405
*URL:* http://www.nezperce.com:80/aboutdis.html
*Summary:* Today, Stan provides interpretive presentations at Rocky Mountain College in Billings, Montana; he is also on the Elderhostel faculty at Rocky, and both he and his wife, Suzie, host the Discovery Vacations. Guests join hosts Stan & Suzie Hoggatt and co-hosts Louis and Shelley Cary at the Hunter Peak Ranch located on the banks of the Clarks Fork River in the beautiful Absaroka Mountains just.

93% The Eagle Page from Rocky Mountain High [More Like This]
*URL:* http://www.sky.net:80/~emily/eagle.html 1406
*Summary:* West Virginia Raptor Rehabilitation Center EAGLE MAILINGLISTS West Virginia West Virginia Raptor Rehabilitation Center EAGLE PRESERVES & PROGRAMS AROUND THE WORLD 1407
92% About the Park [More Like This]
*URL:* http://www.worldweb.com:80/ParksCanada-Jasper/about.html
*Summary:* Jasper spans 10.878 square kilometers (4200 square miles) of broad valleys, rugged mountains, glaciers, forests, alpine meadows and

SYSTEM AND METHOD FOR LOCATING RESOURCES ON A NETWORK USING RESOURCE EVALUATIONS DERIVED FROM ELECTRONIC MESSAGES

FIELD OF THE INVENTION

This application is based on provisional application No. 60/013,518, filed Mar. 15, 1996. The field of this invention is locating resources on a network, and particularly using resource evaluation information derived from electronic messages to locate resources on a network.

BACKGROUND OF THE INVENTION

Known methods of locating resources on a network and storing resource information in a searchable database are able to find resources whose text is related to a search string submitted by a user. In one known search methodology, the text of a resource is related to a search string if the text contains at least part of the search string. In more sophisticated search methodologies, the resource text is related to a search string if the text includes strings that are linguistically related to the search string.

In large network having many resources, a search string (or "keyword") search is likely to retrieve references to hundreds of even thousands of resources by known search techniques. For example, the Internet provides search engines (software programs that find and store index information for Internet resources that is searchable using a search string) that return every resource in the engine's database that is deemed to be appropriately related to the search string under the employed search methodology. This generally returns information on many more resources than the user can possible browse, and no information on which listed resources are the most valuable (e.g., most popular, acclaimed, etc.), leaving the user to wade through hundreds of resources. In essence, the signal-to-noise ratio for this kind of resource search is low.

An example of such a search engine on the World Wide Web is called Lycos, found at <http://www.lycos.com/>. In response to the search string "bob dylan", Lycos returned a list of over 29,000 "relevant" resources 101, the first page of which is shown in FIG. 1. The results are supposedly ranked from most relevant to least relevant, with percentage ratings 102 provided for each resource. Relevancy is determined by the textual similarity of a resource to the search string. In a simple case, the resources are ordered by the number of times that the search string appears in the text. In the example shown in FIG. 1, each resource has a resource title 103 and a somewhat cryptic description 104 evidently derived from the text of the resource itself. The value of each description can be limited. For example, the description for the first, purportedly most relevant resource provides a date 105 with no information as to what the date 105 refers, the last modification date 106, content type 107, length 108, and other information that is normally of little value to a user in deciding if the resource is responsive to her needs. The URL of the resource 109 is provided along with the resource size 110. Information for other resources listed on the page follows the same format, and is about as useful for determining if a resource is worthwhile. The quality of these resources is not addressed by the search engine. The user is hence not much better off than before she submitted her search. Lycos has provided the user with about 29,000 leads with little to distinguish the most useful, highest quality, or widely recognized resources from those that are of limited or no usefulness to the user.

Other methods of locating resources on a network include ARCHIE, a program that resides on a network server that provides searchable indexes of resource directory information; GOPHER, a network server program that provides searchable menu-based access to network resources; VERONICA, a network server program that provides searchable indexes of GOPHER menus from a plurality of server; Wide Area Information Services (WAIS), a distributed text searching system that examines indexes of network resources. Each of these search techniques provide information on network resources without systematically including an evaluation of any such resource.

Often faced with an overwhelming amount of information returned by known resource location techniques in response to a user query, the user is frequently unable to locate the resources that are the most responsive to her needs. As presently implemented, known methods of separating more relevant from less relevant resources are imperfect and sometimes ineffective or laborious for the user. For example, presenting resources that include the highest number of occurrences of the user's search string (e.g., that have the highest number of "hits") often misses the target. This is because such a metric for relevancy fails to take into account the context in which the search string appears in the resource. Thus, the search string "snake" may return resources concerning reptiles, rivers, plumbing devices, and resources in which the term "snake" is used frequently as a verb. A better approach would provide data useful for assessing the character and value of the information provided by a resource.

A known method for providing contextual information associated with network resources is implemented in certain search engines, such as Yahoo at <http://www.yahoo.com>. As shown in FIG. 2, Yahoo presents network resources under predetermined categories, such as Arts and Humanities 21, Science 22, etc. These categories are generated by human intervention, and human input is required to provide the contextual information provided by the categorization and information on individual resources. The contextual information on individual resources is generally provided by users (often the originator of the resource), who register the resource with the engine.

While engines such as Yahoo provide some contextual information for resources, such contextual information is often biased because it is commonly provided by the originator of the resource. Further, the vast majority of the resources searchable through the engine are registered by their originators, who also select the categories under which the resource appears. This results in inaccuracies and inconsistencies, as resources providing similar information are registered under different categories. Some of these problems have been addressed by hiring professional librarians and subject matter experts to intervene and provide context for the stored collection of resource information. However, reliance upon paid human intervention in this fashion is expensive, tedious, and slow. The resources on a large network such as the Internet grow and change at such a rapid pace that human entry of resource information is an inadequate means for capturing the full range of what is available.

A searchable database comprising automatically gathered and analyzed information on resources that have been evaluated would provide an efficient and effective means of locating a wide range of resources that have been recognized as valuable by and for users. Although human evaluations are necessarily subjective, the credibility of an evaluation is enhanced when concurring evaluations are made independently by more and more people. An important step in building such a database would involve locating and exploiting a body of resource evaluation data that is substantial and broad enough to provide credible evaluations of a wide range of network resources, and that is inexpensively available.

Such resource evaluation data would be even more valuable if it included thematic data, or data from which thematic information pertaining to the evaluation could be derived. Such data would provide a richer, more useful way to present resource information responsive to a user request. By grouping resource information thematically, the user is provided the opportunity to search by theme, which can be more effective for certain searches than traditional search methods (e.g., keyword searches). This is particularly true for searches seeking general information on a given topic. Thematic information advantageously provides a contextual framework that makes it easier for the user to locate and examine the resources that are the most pertinent to user's needs.

Electronic messages are sent and received in substantial numbers in large networks. The subject matter of such messages are as diverse as the human concerns that motivate any person-to-person communications. One such concern is the evaluation and recommendation of network resources. The frequency of occurrence of messages evaluating a network resource in the overall volume of message traffic is small. Hence, a large number of messages would have to be efficiently examined to identify those which comprise evaluations.

An example of a large network that generates a large amount of electronic message traffic is the Internet. One of the services provided on the Internet (and on other networks) is USENET, an informal organization of servers that host newsgroups related to particular areas of interest. The topic of each newsgroup is indicated by its name. For example, newsgroups beginning with "rec" concern hobbies and other recreational activities. Increasing detail is provided by address segments to the right of the category. Thus, rec.music.folk provides a forum for users to post messages regarding folk music. The newsgroup topic appears in every message posted to the newsgroup, and provides thematic information for every message. The newsgroup functions as an electronic public bulletin board, on which users sequentially post messages visible to all on the topic of the group. Examples of other organizations that generate substantial electronic messages that would be useful sources of network resource evaluations include bionet for biologists; BITNET listservs, which distribute electronic user messages via e-mail; hepnet for high energy physics; and Clarinet. It is also common for large corporations to have both public and private netnews networks, on which messages of general or particular interest are posted. Such messages may or may not provide thematic information, depending upon the architecture of the particular netnews system.

Electronic messages comprise a substantial and continually renewed base of data that contains a small but significant percentage of network resource evaluations. Efficiently mining a substantial number of these messages for such evaluations would economically provide the raw material for generating a new kind of searchable index of network resources that could point a user towards resources that have been recognized and discussed by other users. Searching for and presenting evaluated sites to a user in response to a search request would be substantially more likely to provide resource information responsive to the user's needs than a simple keyword search of all network resources which returns resource information based upon the frequency of occurrence of the search term in the resource. Further, making the evaluations for resources available to the user would allow the user to make independent assessments of the likely quality and responsiveness of a given resource for her needs. The challenges in developing a system and method to carry this out would include obtaining a sufficiently large volume of messages to search such that a useful number of evaluations could be derived therefrom; distinguishing messages that are evaluations from messages that are not; and storing and presenting the evaluations and evaluated resource identifiers to the user in a way that the user can easily understand, and further use to obtain copies of evaluated resources.

BRIEF DESCRIPTION OF THE DRAWINGS

FIG. 1 shows a prior art embodiment of a known search method.

FIG. 4 shows a prior art embodiment of a newsgroup message.

FIG. 8 shows an embodiment of a top-level interface in accordance with the present invention.

FIG. 9 shows an embodiment of an intermediate-level interface in accordance with the present invention.

FIG. 10 shows an embodiment of a lower intermediate interface in accordance with the present invention.

FIG. 11 shows an embodiment of a low-level interface in accordance with the present invention.

FIG. 12 shows an embodiment of an evaluator list interface in accordance with the present invention.

FIG. 13 shows an embodiment of an evaluation display interface in accordance with the present invention.

FIG. 14 shows an embodiment of the results of a prior art search method.

DETAILED DESCRIPTION

Figure 2:
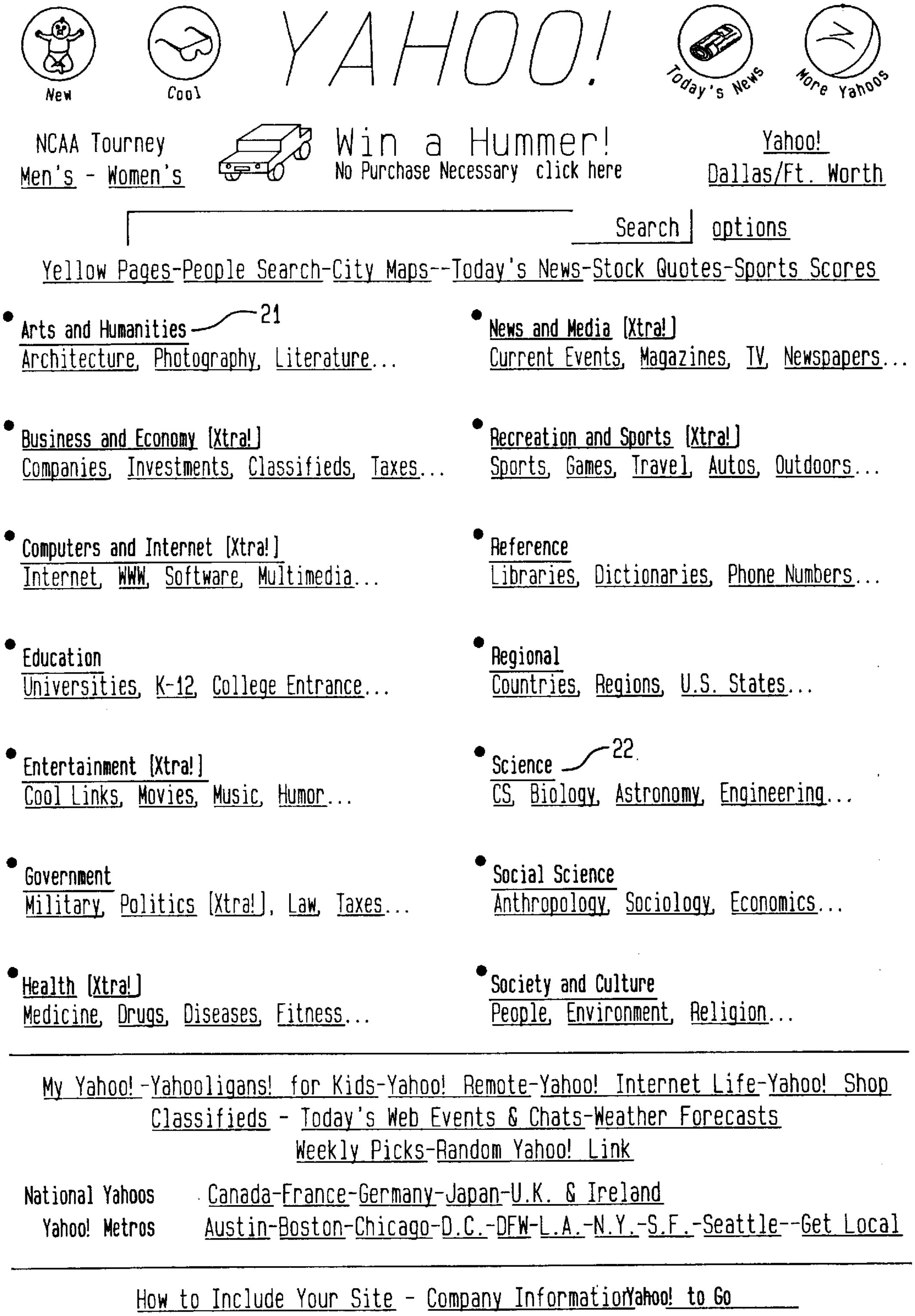
FIG. 2 shows a prior art embodiment of another known search method.
Figure 3:
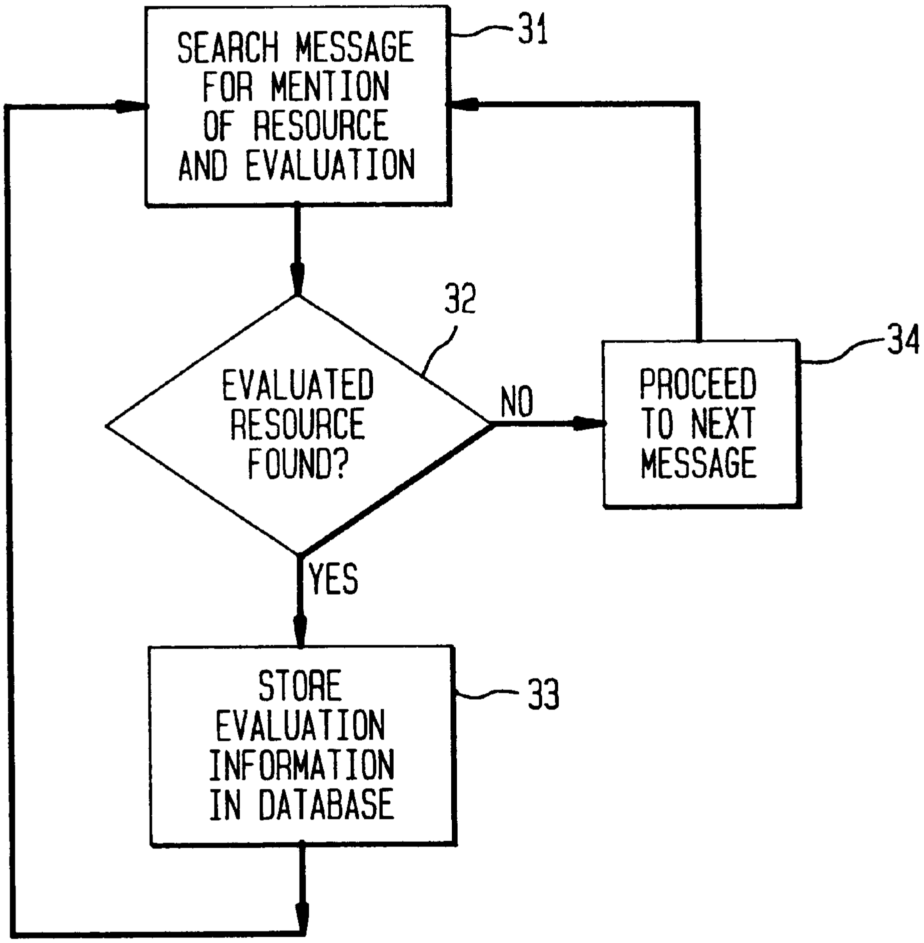
FIG. 3 shows an embodiment of the method for finding and storing evaluation information in accordance with the present invention.

A diagram showing an embodiment of a method for obtaining and storing evaluation information in accordance with the present invention is shown in FIG. 3. The present invention searches an electronic message for a mention of a network resource that is an evaluation of the resource 31 whose location on the network is described by a Universal Resource Locator (URL), or an equivalent thereof. As used herein, a network can be a single network, or a network of interconnected networks. An example of a network is the Internet. An example of a URL is "http:// www.thegearpage.com/home.htm.” The term evaluation encompasses any comments made by a user about a network resource. Evaluation information is any information pertaining to an evaluation, including comments by a user, the identity of the user, the date the comments were posted by the user, etc. Placing a URL for a network resource in a list and characterizing the list can be an evaluation of the resource. A resource is any information available on a network. In one embodiment, a resource is any information on the Internet whose location is described by a URL. An example of an equivalent to this URL is “www.thegearpage.com”. An equivalent to a URL is a string which can be used to construct or obtain the actual URL of a resource. Hereinafter, the term “URL” refers both to a URL and its equivalents. If a mention containing a URL for a resource is found and is further determined to be an evaluation of the resource 32, then the evaluation information is stored in a database 33. The rest of the message is then searched 31, and additional resource evaluation information is stored in the database 33. This process continues until no more resource evaluation mentions are found in the message, wherein the next message is considered 34, and the method is carried out again. If no resource evaluations are found in a message 32, the next message is considered 34, and the method is carried out on the next message. The database is searchable by users in known fashion.

In one embodiment of the present invention, USENET newsgroup messages are retrieved from a server on the Internet and stored in computer-readable memory. An example of a USENET newsgroup message is shown in FIG. 4. Each newsgroup message includes header information 411 and a body 412. Some messages also include a signature 413 provided by the author.

The header information 411 includes a subject 414, a date 415, the URL or e-mail address of the author of the message 416, the author's organization 417, the identity of newsgroups to which the message has been posted 418, and other information.

The body is often comprised of textual data that conveys the substance of the message sent by the author 419, and can include the contents of another message 420 written by a different author to which the author of the present message wishes to refer. The identity of the other author 421 of the other message 420 is provided at the top of the text from the other message 420. The body 412 can also be comprised of encrypted text or computer programming code.

After the body 412, the signature 413 can include the identity of the author of the message 422, the author's title 423 and organization 424, mailing address 425, e-mail address 426, telephone numbers 427, and the URL of another network resource 428 sponsored by or affiliated with the author.

Figure 5:
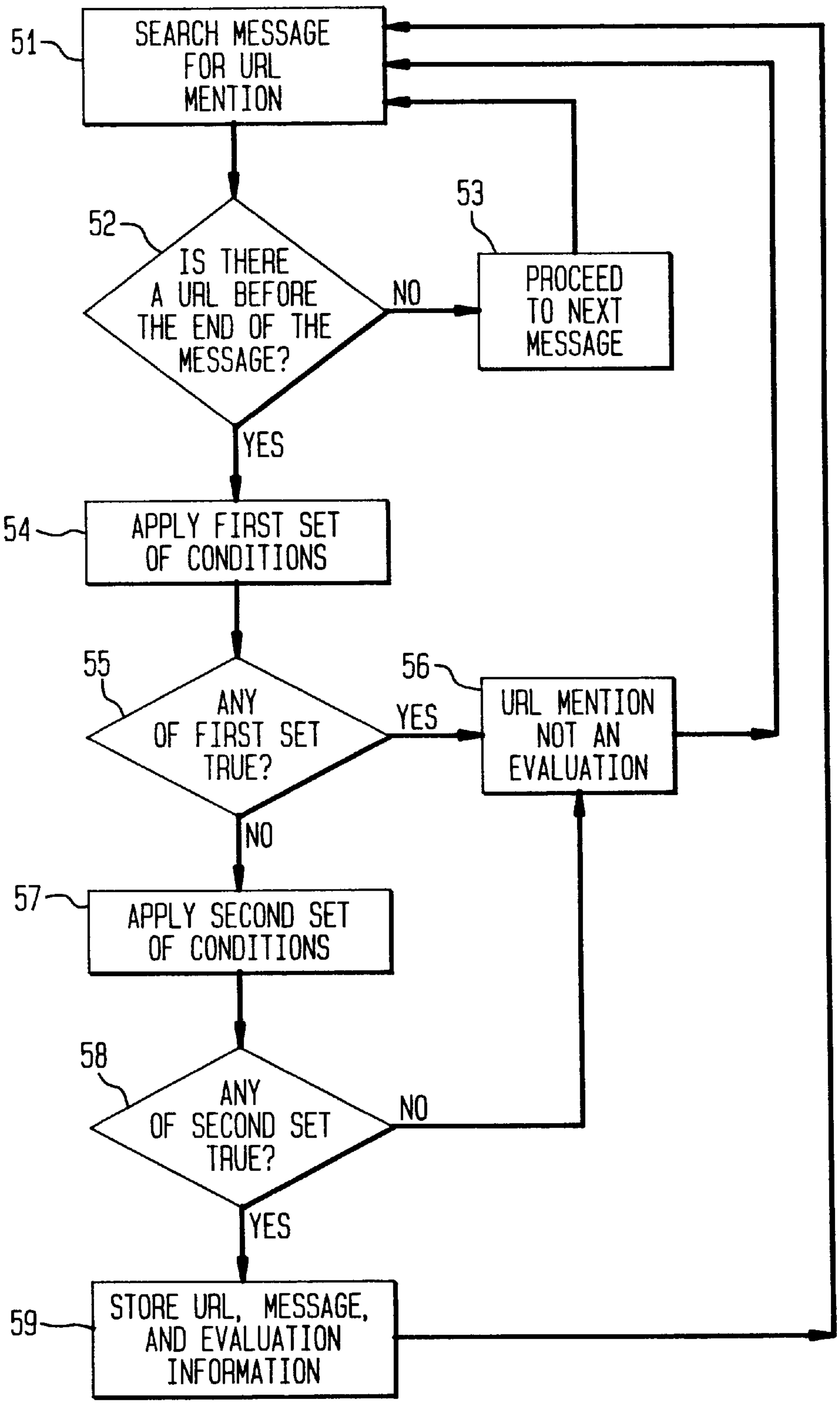
FIG. 5 shows an embodiment of the method for finding determining if a URL mention is an evaluation.

In accordance with the present invention, electronic messages such as newsgroup messages are obtained and searched for evaluations of network resources. The present invention determines if a message has an evaluation in two stages as shown in FIG. 5. First, the present invention searches the message for the occurrence of a URL 51, also known as a mention of a URL. Note the term “URL” is defined to be the URL of a resource and its equivalents. If the entire message does not include a URL mention 52, the next message is considered 53 and searched for a URL mention. If a URL mention is found 52, the mention and the message are examined to determine if the mention is an evaluation 54. This is carried out in two stages described below.

A message may contain several mentions of URLs, some of which may be evaluations of a given URL, and some of which may not be evaluations. For example, a message that evaluates two resources at two URLs may also contain a signature block that includes the home page of the evaluator. In this case, the mention of the author's home page URL is not an evaluation, while the mention of the other two URLs are evaluations. Each URL mention in a message is examined to determine if the mention is an evaluation. In one embodiment, the present invention identifies a URL mention by detecting any protocol designation used on the network followed by the string “//:”. A string is defined herein to be a set of characters. Examples of strings in the message shown in FIG. 4 include “”11 Mar., 1997”, tuan@spicey.asd.sgi.com”, “tuan@spicey.asd”, and “rec.climbing”. A substring is defined to be any subset of a defined string. Thus, if a string is defined to be “tuan@spicey.asd”, examples of substrings include “tuan”, “@”, and “ey.as”. In accordance with one embodiment of the present invention, a message containing any of the strings http://, ftp://, telnet:// or gopher:// is determined to have a URL. In another embodiment, any mention containing the string “//:” is determined to be a URL mention in accordance with the present invention.

In some cases, the author of a message that contains an evaluation refers to the network resource by an equivalent to a URL, for example dropping the protocol designation. Thus, an author may refer to the resource whose full URL is “http://www.thegearpage.com/home.htm” as “www.thegearpage.com”. The present invention is also able to recognize such strings as URL equivalents from which a URL can be constructed. In one embodiment, the present invention determines that a message has a URL if it has a string of the form *.top_level_domain, where top_level_domain is any string that serves as a top level domain name on the Internet, and * is any string. In one embodiment, the present invention determines that a message has a URL if it contains any one of the strings from the group of: .com, .edu, .org, .net, .mil, .int, .gov, .firm, .store, .web, .arts, .rec, .info, .nom, .us, .uk, .il, .fr, and all other top level domain designations that indicate a country. The present invention can recognize any other top level domain names as well. Top level domain information can be found in RFC 1480 and 1591, as well as from the International Ad Hoc Committee (IAHC)<http://www.iahc.org>. An RFC is an Internet Request for Comments that serves as a standard or guideline for the Internet. RFCs are publicly available on the Internet.

In yet another embodiment, the present invention recognizes specialized strings as URL equivalents. For example, the string: “the address of the website is thegearpage.com” provides sufficient information from which to construct the URL, and hence the string is a URL equivalent. The occurrence of “address” indicates that the following information pertains to a URL. The occurrence of “website” indicates that the address is likely to begin with the string “http://” or “http://www.”. Either or both may be tried, and the address that fetches a resource can be considered to be the URL of the reviewed resource. The string gearpage.com occurring in this context indicates a part of a URL. Hence, this example is a URL equivalent that the present invention is advantageously able to detect as a URL equivalent.

Once a URL mention has been detected, the message is examined in accordance with the present invention to determine if each URL mention in the message is an evaluation of the URL 53. This is carried out by testing the URL mention and the message against certain conditions. If any condition of the first set is true, then the URL mention is not an evaluation 56, and the message is further searched for another URL mention 51. If no condition of the first set is true 55, then the second set of conditions is tested 57. If any condition of the second set is true 58, then information from the message including the URL is stored in a database 59 as evaluation information for the resource located at the URL. Otherwise, the URL mention is not an evaluation 56, and the message is further searched for another URL mention 51.

Figure 6:
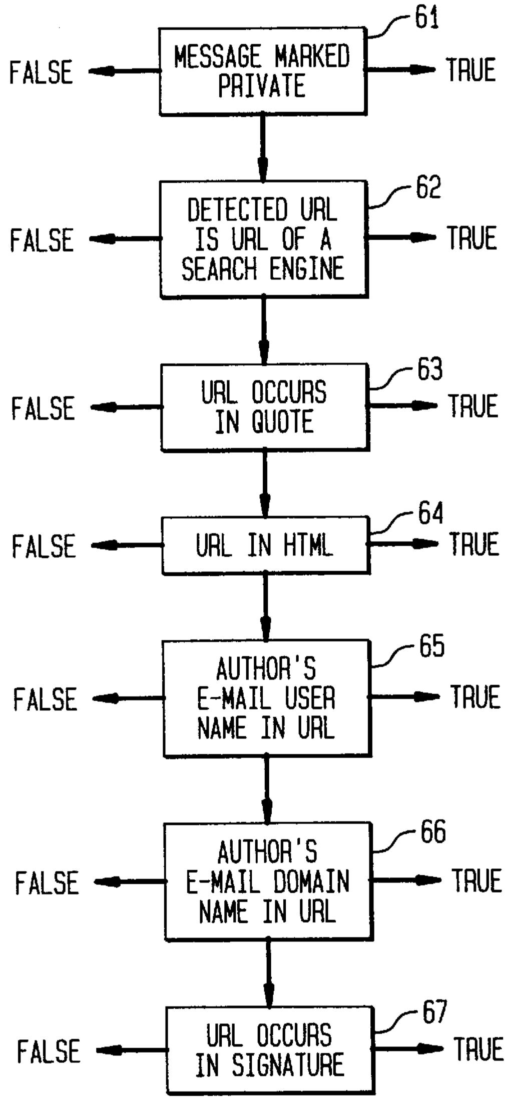
FIG. 6 shows an embodiment of the conditions that must all be false in order for a URL mention for the mention to be an evaluation.

As shown in FIG. 6, an embodiment of the conditions in the first set include: 1) the message is marked private 61. In this event, the author wishes to restrict the dissemination and/or use of his message, which the present invention respects. Thus, the present invention will not classify such a message as an evaluation. In another embodiment, the present invention uses the message as an evaluation even if it marked private, but strips any information pertaining directly or indirectly to the author before using the message 2) The domain name of the URL is the URL of a search engine 62. This screens out messages that refer to search engines. Examples of URLs for search engines include http://www.yahoo.com; http://; http://www.infoseek.com; http://www.excite.com; http://www.lycos.com; http://altavista.digital.com; and http://webcrawler.com. 3) The URL in the message occurs in a quote from another message 63. This reduces the possibility of the same evaluation being counted twice, once from the original author, and once from the quoting author. 4) The URL occurs in Hypertext Markup Language (HTML) code 64. HTML is the computer language used to generate hypertext pages on the World Wide Web, and is not likely to comprise an evaluation; 5) The message author's e-mail username appears as a substring of the URL mention 65. When this occurs, the author is usually recommending his own resource, rendering the evaluation biased and undesirable for the present invention. 6) The message author's e-mail domain name appears as a substring of the URL 66. This indicates that the evaluated resource is associated with the author of the message, rendering the evaluation possibly biased and undesirable. 7) The domain name of the organization of the message author appears as a substring of the URL 67. Again, this indicates an association between the author of the message and the evaluated resource, indicating the possibility of bias. 7) The URL occurs in the signature of the message 68. It is a common practice to place a URL in the signature of a message 429, as shown in FIG. 4. In this case, the URL is not included as a part of an evaluation. If all of the conditions in this first set of conditions are false, then the second set of conditions is tested. But if any of the conditions in this first set are true, then the URL mention is not classified as an evaluation.

Figure 7:
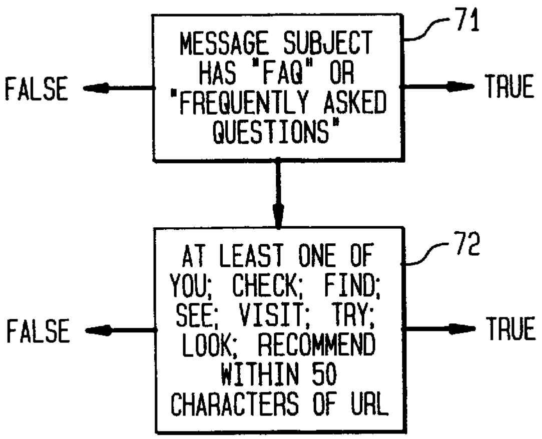
FIG. 7 shows an embodiment of the conditions one of which must be true in order for a URL mention to be an evaluation.

An embodiment of the second set of conditions (shown in FIG. 7) includes: 1) The message subject 414 (FIG. 4) contains at least one string from the group of: FAQ and "Frequently Asked Questions", The letters of these strings can be either uppercase, lowercase, or a mixture thereof (i.e., the strings are case-insensitive) 71. 2) The text of the message within from one to fifty characters of the occurrence of the URL includes at least one case-insensitive string from the group of: you; check; find; see; visit; try; look and recommend 72. If any of the conditions of this second set of conditions is true, then the URL mention is classified as an evaluation. If none of the conditions of this second set are true, then the URL mention is not classified as an evaluation. The present invention advantageously searches messages for any regular expression that is useful for determining properties of the message or types of information contained in the message. For example, the present invention searches for the string "FAQ" in the subject of the message to determine if a URL mention is an evaluation, and for strings of the form *.top__level__domain to identify a URL mention. The present invention is also capable of searching for expressions such as "att" in the body of messages to identify mentions of the American Telephone & Telegraph company; "bryce canyon" in the subject line to identify messages concerning Bryce Canyon National Park; and the stings "terveen" and "att" in the author line to identify messages authored by a particular person.

Once a URL mention has been identified as an evaluation, information such as, for example, a searchable record including the evaluated URL and other data, such as header information from the message in which the URL mention occurred, is stored in a searchable database. In one embodiment of the present invention, the URL is stored with text from the body of the evaluation message. In one embodiment, fifty characters on either side of the occurrence of the URL is stored. In another embodiment, the entire body is stored. In yet another embodiment, text from the body is stored starting from the beginning of the message and ending until just after the occurrence of the URL. Additional useful data is stored as a part of the searchable record in other embodiments. An embodiment of elements contained in a data structure for a searchable record is shown as follows:

Message: An internal record number;
Date: The date message was sent;
Name: The name of the sender;
replyName: The email address to which to reply;
MsgID: The message identifier from message header;
organization: The author's organization;
mailNamesEmail: The parsed parts of email name;
mailNamesReplyTo: The parsed parts of reply to address;
msgLength: The length of whole message;
bodyLength: The length of message body;
accessDate: The last access date;
modDate: The last modification date;
createDate: The creation date;
msgFeatures: Features found in message used to classify a URL mention;
Header: A linked list of header lines; and
Body: A linked list of body blocks.

In yet another embodiment of the present invention, the resource at the URL contained in an evaluation message is fetched. The textual contents of the resource are condensed and stored as a part of the searchable record on the database. This condensed content of a resource can be advantageously made available for keyword searches submitted by users. In one embodiment, descriptive information pertaining to the resource can be advantageously extracted from the fetched resource or the condensed content, and stored separately as a part of the searchable record. This can be provided to the user as a short description of the resource. In on embodiment, the descriptive information is the text contained between the HTML tags <TITLE> and </TITLE> of a resource that is a hypertext file. Another advantage of fetching a resource is to ensure that the evaluated URL is still valid. A URL is valid if the resource it locates is still available.

The searchable records are stored collectively in a database searchable by a user. The user may search the database by submitting one or more keywords. The keywords form the basis for a search that can be carried out using known methods. In one embodiment, records whose condensed contents are the most relevant to the user keyword search are identified and ranked from most relevant to least. The URL of each relevant resource is presented to the user along with a short description of the resource that was extracted when the resource was fetched earlier. The number and recency of evaluations for each URL are shown to the user. In one embodiment, the user is shown the content of the evaluation, and is able to send a message to the author by selecting the author's name in the displayed evaluation. In this way, the user can advantageously further investigate the quality of a resource or resources before fetching it. This is especially useful when the evaluation occurs in a message called a Frequently Asked Questions, or FAQ. A FAQ message is generally authored by a person with broad expertise in the relevant area who often has a good command of many of the best resources in a given area. The present invention advantageously provides a vehicle for helping to establish contact between a user and an expert who has authored a FAQ.

When the evaluation messages can be grouped thematically, the user interface between the database and the user can have even more advantageous features. In an embodiment of a user interface that uses thematic information in accordance with the present invention shown in FIG. 8. Top level thematic group names are displayed to the user. An example of such a top level group is "recreation" 811. The number of evaluations within each top level thematic group is also shown. There are 21345 evaluations 812 for the recreation group 811. Some of the areas within each top level group are also shown. The three areas animals 813, antiques 814 and arts 815 are shown underneath recreation 811. In another embodiment of the present invention, the three areas that are most often visited by users are shown for each top level area. The present invention also advantageously provides the means for users to communicate with the creators and/or administrators of the embodiment via e-mail 816.

The embodiment shown in FIG. 8 is a hypertext document. Thus, the user can proceed to search the database by selecting a top level group name 811. Alternatively, the present invention advantageously provides the user with the option of submitting a more direct search for evaluated resources in a particular newsgroup 817.

Figure 8A:
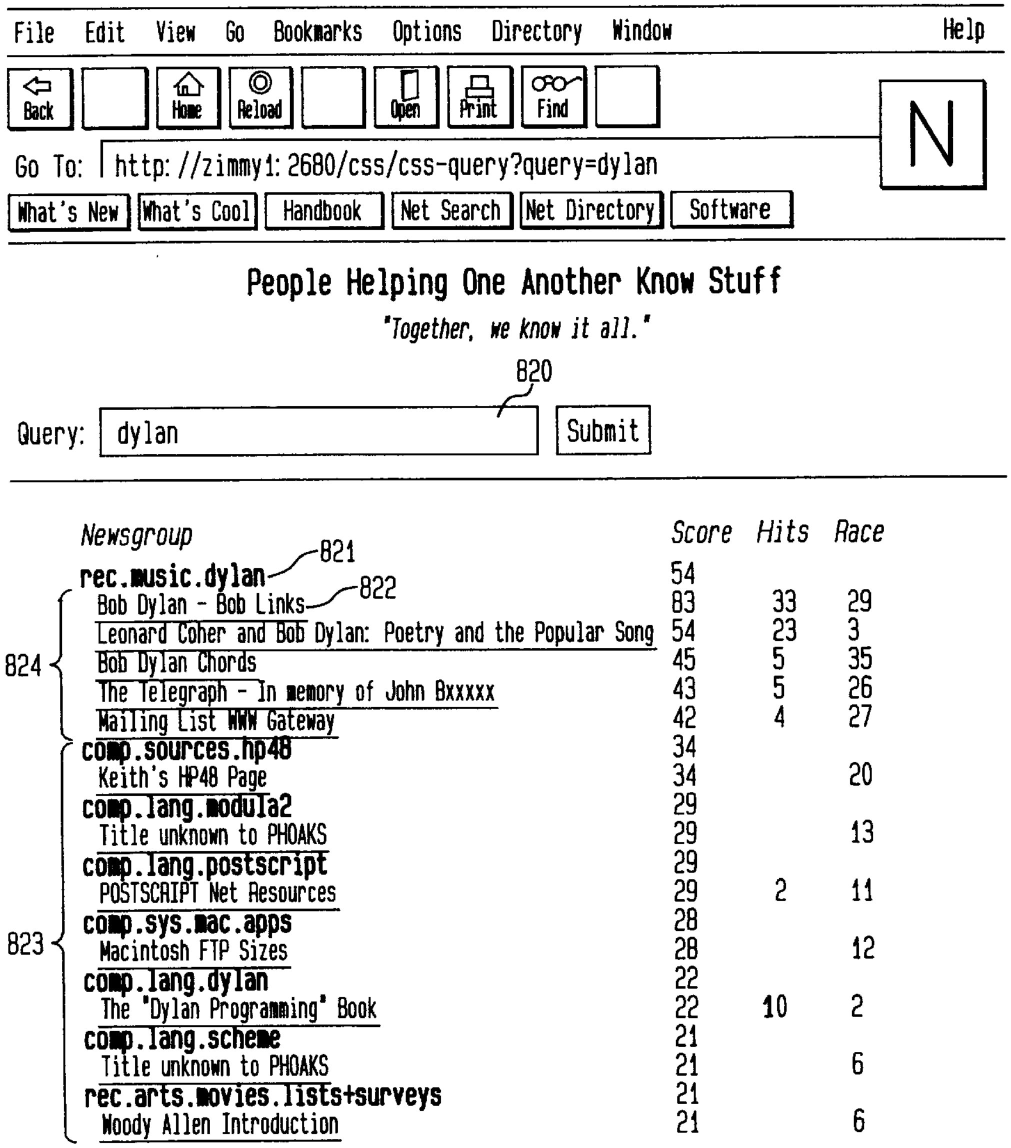
FIG. 8*a* shows another embodiment of a top-level interface in accordance with the present invention.

Another embodiment of an interface through which a user can search the database is shown in FIG. 8*a*. The interface presents a search request input box 820 into which the user submits a keyword search. In accordance with the present invention, the database is searched for relevant evaluated resources. In carrying out the search, each resource is assigned a score that is derived from the textual or linguistic similarity of the resource information stored in the database and the number of distinct evaluators for a given resource. The greater the similarity and the higher the number of distinct evaluators, the higher the score for a given resource. In one embodiment, the number of occurrences of the user search request string in the resource information is averaged with the number of distinct evaluators for the resource to obtain the score. In another embodiment, the number of distinct evaluators are weighted more heavily than the number of occurrences of the search string in the resource information. In one embodiment, the most relevant resources are presented by newsgroup, the newsgroup with the greatest number of relevant resources 821 with the highest scoring resources appears first, with lower-scoring newsgroups following in descending order 823. Within each newsgroup, resources 824 are presented in descending order of relevance based upon their scores. When a user selects a newsgroup 821, an interface showing evaluation information is displayed to the user, an embodiment of which is shown in FIG. 11. The embodiment shown in FIG. 11 shows resources for a different newsgroup than that displayed first 821 in FIG. 8*b*.

When the user selects a top level group name in the interface shown in FIG. 8, the areas within that group are displayed to the user, the first page of which as shown in FIG. 9. An example of a group area is outdoors 91. Some of the subareas within outdoors, camping 92, fishing 93 and marketplace 94 are listed below outdoors 91. The number of evaluations in the outdoor area 95 is also presented to the user. The top level group under which these areas and subareas appear 96 is shown to the user at the top of the page.

When the user selects outdoors 91, a fill listing of the subareas under outdoors is displayed to the user as shown in FIG. 10. When a user selects a subarea such as National Parks 1001, the resources for which evaluations were found within the national parks subarea are presented to the user, as shown in FIG. 11. In this embodiment, the most evaluated resources are shown to the user ranked by number of distinct evaluators. A short title describing the resource 1101 is followed by the number of distinct evaluators 1102, and a series of evaluation message bars 1103. The message bars 1103 are color-coded to indicate the recency of the evaluation to which each refers. For example, the message bar for a very recent evaluation would be green; the message bar for an older evaluation would be yellow; and the message bar for a very old evaluation would be red.

If the user selects a resource title 1101, the resource is fetched and displayed to the user. If the user selects the number of distinct evaluators 1102 a list of evaluators 1201 is displayed as shown in FIG. 12, along with the name of the evaluated resource 1102, and message bars 1103 that are color-coded to indicate the recency of the evaluations. The evaluators are ranked by the number of evaluations each has posted to the newsgroup. This advantageously ranks evaluators who are most active first, based upon a correlation between activity level and expertise in the area.

The interface shown in FIG. 11 also shows at least portions of selected evaluation messages in which the resources 1101 appeared. These evaluation message excerpts are derived from records of evaluation information stored in the database. In this embodiment, the excerpts for a given resource are displayed to the user when the user selects the message bars 1003 for a given resource 1001 as shown in FIG. 10. An embodiment of a page of the evaluation message excerpts displayed to the user when the user selects the message bars 1003 for Rocky Mountain National Park is shown in FIG. 13. Each excerpt comprises header information 1301 that includes the author's e-mail address 1302, the subject of the evaluation 1303, and the date on which the evaluation was posted to the newsgroup 1304. An excerpt from the body of the evaluation 1205 is also included. The excerpt comprises text surrounding each mention of a URL in the bo*dy. The URL for Rocky Mountain National Park <http://estes.on-line.com/rmnp> 1306 is advantageously presented surrounded by text that allows the user to read the evaluation information provided by the author of the evaluation. Here, the author praises the resource as part of the Estes Park Convention and Visitor's Bureau's efforts to "go to great lengths to be helpful." The author further provides a toll-free telephone number 1307 that the user can advantageously call for more information, and the URLs of two other resources 1308 that supplement and complement the information available from the resource selected by the user 1001. This illustrates a principal advantage of the present invention over traditional search methods. The present invention advantageously presents search results that are based upon the context of the user's request, not just a keyword search that operates on the principle of returning resources with textual or linguistic similarities to the keyword. In other words, the present invention is advantageously able to provide the user with meaningful evaluation information on a primary resource, but also supplies the user with additional information and secondary resources that another user found useful when discussed together with the primary resource. The advantages of the present invention are vividly demonstrated by comparing FIG. 13 with FIG. 14. FIG. 14 shows the first page of the results of a search for the keywords Rocky Mountain National Park using a popular search engine (Excite at <http:/www.excite.com>) that utilizes traditional, known search techniques.

As shown in FIG. 14, the search string "rocky mountain national park" returned over three million resources 1401. The documents are sorted by "relevance" 1402, the first four and part of the fifth of which are shown in FIG. 14. The resources concern river rafting 1403, which may or may not occur in Rocky Mountain National Park (RMNP); travel in Alberta, Canada 1404; a ranch vacation 1405; a West Virginia eagle preservation program 1406; and Jasper Park in Canada 1407. None of the first five resources is pertinent to RMNP, and none of these resource summaries contain a reference to the URL for the Estes Park web site recommended as an excellent resource for information on RMNP by two evaluators as found, recorded, and presented to a user by the present invention. The summary information about each resource provided by the Excite search is evidently a part of the resource itself, and appears to be promotional in nature. There is no indication that the summary information was provided by an apparently independent evaluator, as is advantageously provided by the present invention. Likewise, there is no indication of when the information was obtained, or who authored the information. Finally, the information for each resource is monolithic: there is no discussion of other relevant resources as is advantageously provided by the present invention.

The embodiments of the present invention discussed above are only exemplary, and do not limit the scope of the invention with respect to other embodiments. The present invention can be effectively embodied to provide contextual information on resources discussed by electronic mail messages; netnews forums inside private companies; printed matter that has been scanned to produce electronic text; and voice information that can be represented and searched electronically.

Figure 15:
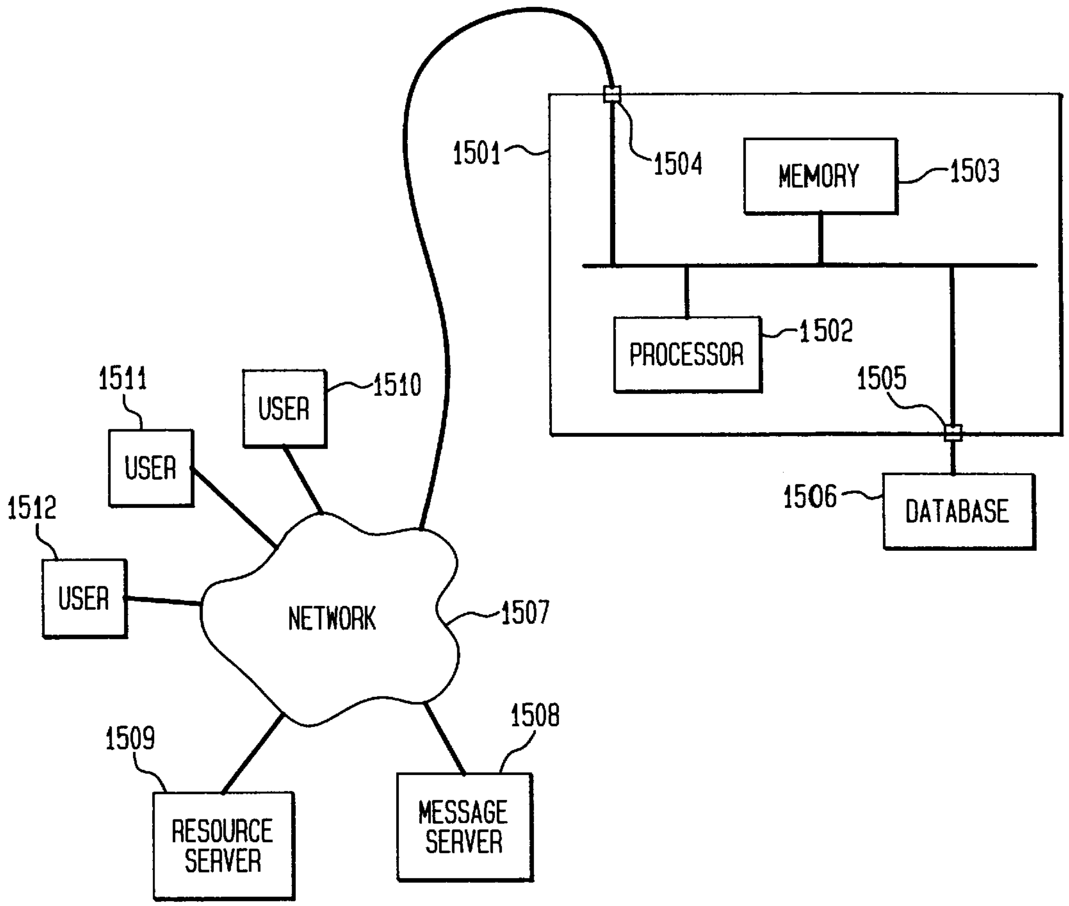
FIG. 15 shows an embodiment of a system in accordance with the present invention.

A embodiment of a system in accordance with the present invention is shown in FIG. 15. An evaluation server 1501 comprises a processor 1502, computer readable memory 1503, a port to be coupled to a network 1504, a port adapted to be coupled to a database 1505, all interconnected by a data bus 1506. The evaluation server 1501 is coupled to a network 1507 with the network port 1504 is connected to a database 1506. The evaluation server 1501 is connected to a network. A message server 1508, resource server 1509 and several users 1510, 1511 and 1512 are also connected to the network. In accordance with the present invention, electronic messages are fetched by the evaluation server 1501 from the message server 1508 and searched for resource evaluation messages. When an evaluation is found, the resource is fetched from the resource server 1509. If the resource is successfully fetched, information from the resource are combined with evaluation information from the evaluation message and stored as a searchable record in the database 1506. A user 1510 submits a search request to the evaluation server through the network. The network returns resource evaluation information from relevant records in the database to the user 1510.

The present invention provides a context-rich, searchable database of evaluated resources that provides more relevant information to a user in a quantity and form that is less laborious for the user to digest than the results provided by known search methods. The present invention builds the database efficiently and economically, automatically searching large quantities of free electronic messages. By capturing the wealth of expertise and experience pertaining to resources available on a network and making that expertise and experience available to users, the present invention enables users to more quickly, more accurately, and more effectively locate the network resources that best provide the information they need.

What is claimed is:

1. A method for locating resources available on a network by storing resource evaluation information from electronic messages, comprising the steps of:

a. determining if a message includes a Uniform Resource Locator;

b. if the message includes a Uniform Resource Locator, then determining if the message also includes evaluation information about a resource located at the Uniform Resource Locator; and c. if the message includes both a Uniform Resource Locator and evaluation information about a resource located at the Uniform Resource Locator, then storing in a database evaluation information about the resource.

2. The method of claim 1, wherein a message is determined to include a Uniform Resource Locator if it includes a protocol identifier string.

3. The method of claim 1, wherein a message is determined to include a Uniform Resource Locator if the message includes at least one string from the group: ftp://, http://, nntp://, wais://, file://, telnet://, rlogin://, mailto:, and news.

4. The method of claim 1, wherein a message is determined to include a Uniform Resource Locator if the message includes at least one string from the group: .com, .org., net, .edu, .gov, .mil, .firm, .web, .store, .arts, rec, .info and .nom.

5. The method of claim 1, wherein a message is determined to include a Uniform Resource Locator if the message includes a string having the format of a.b, wherein a is an alphanumeric string, and b is a top level domain name.

6. The method of claim 1, wherein a message that includes a Uniform Resource Locator is determined to also include evaluation information about the resource located at the Uniform Resource Locator if:

a. all of the following conditions are false:
   i. the message is marked private;
   ii. the domain name of the Uniform Resource Locator is the Uniform Resource Locator of a search engine;
   iii. the Uniform Resource Locator identified occurs in a quote from another message;
   iv. the Uniform Resource Locator occurs in Hypertext Markup Language code;
   v. the message author's e-mail username appears as a substring of the Uniform Resource Locator;
   vi. the message author's e-mail domain name appears as a substring of the Uniform Resource Locator;
   vii. the domain name of the organization of the message author appears as a substring of the Uniform Resource Locator; and
   viii. the Uniform Resource Locator occurs in the signature of the message; and b. if any one of the following conditions is true:
   i. the Uniform Resource Locator identified in step a occurs within from one to fifty words of one of the strings from the group: you, check, find, see, visit, try, look and recommend; and ii. the message subject line contains at least one of the strings from the group of: Frequently Asked Questions and FAQ.

7. The method of claim 1, wherein storing evaluation information about the resource includes storing at least one from the group of: the Uniform Resource Locator, words of the message preceding the occurrence of the Uniform Resource Locator, words of the message following the occurrence of the Uniform Resource Locator, the identity of the author of the message, and a unique message identifier.

8. The method of claim 1, wherein the message is comprised of a header portion and a body portion, and wherein storing evaluation information about the resource includes storing information from the header portion and information from the body portion of the message.

9. The method of claim 1, further comprising the step of fetching a copy of the resource located at the Uniform Resource Locator.

10. The method of claim 9, further comprising the step of storing in the database the contents of at least part of the fetched copy.

11. The method of claim 10, wherein said contents are stored in a condensed format.

12. The method of claim 9, further comprising the steps of:

extracting a resource description from the contents of the fetched copy; and storing the resource description in the database.

13. The method of claim 12, further comprising the step of receiving a search request from a user.

14. The method of claim 13, wherein said user search request is a keyword search, and further comprising the steps of:

searching the database to identify resources having information relevant to the user search request; and assigning a score to each resource identified as being relevant to the user search request, wherein the score is based at least partly upon the number of distinct messages that include both the Uniform Resource Locator of each said resource and evaluation information and the amount of information in each said resource that is relevant to the user search request.

15. The method of claim 14, further comprising the steps of:

determining the maximum number of resources to be presented to a user on a page;

sorting the resources by score from highest score to lowest;

presenting the resources to the user in an order based at least partly upon the score of each resource.

16. The method of claim 15, further comprising the steps of determining the number of distinct evaluators for each resource determined to be relevant to the user search request determining the recency of evaluation information for each resource determined to be relevant to the user search request, and wherein the score of a resource is based at least partly upon the number of distinct evaluators and the recency of the evaluation information for the resource.

17. The method of claim 1, further comprising the step of determining the identity of an evaluator of a resource, and displaying the identity of the evaluator to a user.

18. The method of claim 14, further comprising the step of providing evaluation information included in the message to the user.

19. A system for locating evaluated resources on a network having a message server and a resource server, comprising an evaluation server coupled to an evaluation database, said evaluation server comprising a data bus connecting a processor, a computer readable memory, a first port adapted to be coupled to the network, and a second port adapted to be coupled to the resource database, wherein said evaluation server is adapted to determine through the network if a message stored at the message server includes both a Uniform Resource Locator and evaluation information about a resource located at the Uniform Resource Locator, and if so, then to store evaluation data about the resource in said evaluation database.

20. The system of claim 19, wherein said evaluation server fetches a copy of a resource through the network and stores said copy on a resource database, and wherein information from said copy is displayed to a user in response to a request from the user.

21. A system for locating resources on a network having a resource server and a message server, comprising:

a. means for obtaining an electronic message;

b. means for determining if the electronic message includes both a Uniform Resource Locator and evaluation information about the resource at the Uniform Resource Locator;

c. a database for storing evaluation information about the resource;

d. means for receiving a user request for information;

e. means for searching the stored evaluation information for information in response to the user request; and f. means for displaying evaluation information relevant to the user request to the user.

* * * * *